United States Patent [19]

Daitoku et al.

[11] 4,174,166

[45] Nov. 13, 1979

[54] MOTOR DRIVE DEVICE FOR LONG-FOOTAGE FILM

[75] Inventors: Kouichi Daitoku, Tokyo, Japan; Kouichi Takahata, deceased, late of Tokyo, Japan, by Kosaku Takahata, legal successor

[73] Assignee: Nippon Kogaku K.K., Tokyo, Japan

[21] Appl. No.: 869,792

[22] Filed: Jan. 16, 1978

Related U.S. Application Data

[63] Continuation of Ser. No. 762,452, Jan. 28, 1977, abandoned.

[30] Foreign Application Priority Data

Jan. 30, 1976 [JP] Japan .............................. 51-8661[U]

[51] Int. Cl.² ............................................. G03B 1/18
[52] U.S. Cl. .................................................. 354/173
[58] Field of Search ........................ 354/173, 170, 171

[56] References Cited

U.S. PATENT DOCUMENTS

| | | | |
|---|---|---|---|
| 3,898,679 | 8/1975 | Ogiso et al. | 354/173 |
| 3,927,413 | 12/1975 | Kimura et al. | 354/173 |

Primary Examiner—Michael L. Gellner
Attorney, Agent, or Firm—Fitzpatrick, Cella, Harper & Scinto

[57] ABSTRACT

In a motor drive device for long-footage film having a first motor for effecting shutter release and for driving a constant-amount film feeding sprocket and a second motor for starting to drive to effect take-up of the film onto a spool upon starting of movement of the sprocket, there is provided a timing circuit for generating a shutter release signal which drives the first motor to effect shutter release immediately after the complete stoppage of the second motor and which effects film take-up immediately after completion of the shutter release. The timing circuit repetitively generates such a shutter release signal at a time interval from the shutter release to the complete stoppage of the second motor.

3 Claims, 8 Drawing Figures

MOTOR DRIVE DEVICE FOR LONG-FOOTAGE FILM

This is a continuation of application Ser. No. 762,452 filed on Jan. 28, 1977, now abandoned.

BACKGROUND OF THE INVENTION

1. Field of the Invention

This invention relates to a motor drive device for long-footage film, and more particularly, to such a device for use in cameras wherein a first motor is provided for effecting shutter release, constant-amount feeding of film and shutter charge, and a second motor is provided for effecting take-up of the amount of film subjected to the constant-amount feeding.

2. Description of the Prior Art

Such a motor drive device for long-footage film is capable of effecting single-frame photography and continuous photography, and requires the following sequence of operations to occur in order to effect continuous photography.

First, depression of the operating button for the motor drive device causes the shutter to be released to effect exposure of the film by a mechanism within the camera. After the lapse of the time required for the shutter operation, such as exposure and the like, and the pause time for determining the interval of photography, the first motor M1 is driven to start the next constant-amount feeding of the film while, at the same time, the take-up of the film onto the take-up spool is started by the second motor M2. As soon as the constant-amount feeding by the first motor M1 is completed, there occurs a shift to the operation for effecting the next shutter release. Even if the interval of photography is slowed down, this relationship is invariable with the only exception that the pause time increases.

The motor drive device for long-footage film having such a sequence of operations is provided with a time constant circuit for preventing any excess amount of film from being pulled toward the take-up spool, or for preventing the film from being acted upon by an excess tension at a point of time whereat the take-up has been completed between the constant amount of the film fed by the first motor M1 and the amount of the film to be taken up by the second motor M2, and the time during which the second motor M2 is powered is electrically controlled so that the power supply to the motor M2 is discontinued before the constant-amount feeding by the motor M1 is completed.

However, as the volume of the film is increased to increase the number of frames available for photography, the inertia of the system including the film and the second motor M2 is so greatly increased as to prevent the second motor M2 from being stopped immediately after this motor M2 receives the stop signal from the above-mentioned time constant circuit and thus, a longer time is required before the take-up spool is actually stopped.

Now, the time T from the start of take-up of the second motor M2 (that is, the start of power supply to the second motor M2) until the stoppage thereof differs depending on the diameter of the film roll, and further varies with the amount of film slack at the start of take-up and the take-up velocity (the angular velocity of the take-up spool). Such variation will be discussed in connection with the graph FIG. 1 of the accompanying drawings, wherein the ordinate represents the amount of take-up and the abscissa represents the feeding velocity of the sprocket (indicatd by straight line $L_1$) which is constant. The amount of take-up each time from the start of take-up until the stoppage of the motor M2 may generally be considered in the form of three models. Solid line $L_2$ represents the photography occurring when the diameter of the film roll is small, namely, when the number of exposed frames is small. In this case, as seen, the take-up velocity is great because of the small inertia of the film and reaches the film feeding velocity $L_2$ in a short time, so that the film is taken up under its tight condition with a resultant tendency that an excess amount of film is pulled on toward the take-up spool, but the film is caused to slip by a well-known slip mechanism. After lapse of the time during which the motor M2 is powered, the film continues to slip for a certain short length of time and then gradually comes to a standstill. A time lag from cut off of power to the second motor M2 to the actual stoppage thereof is short, but the tension of film during the the take-up operation is strong. The time lag in this case is defined as $T_2$. Broken line $L_3$ represents the photography occurring in about the intermediate portion of the long-footage film and in this case, the time lag of the motor M2 is greater in accordance with the increased diameter of the film roll, than in the case indicated by solid line $L_2$, and the tension of the take-up is smaller than that in the case of the solid line $L_2$. The time lag in this case is defined as $T_3$. Dots-and dash line $L_4$ represents the photography occurring when the unexposed portion of the film is about to terminate. The time lag in this case is also longer than in the case of the Curve $L_3$, but the tension of the film take-up is smaller than in the case of the Curve $L_3$. The time lag of this case is defined as $T_4$. Where motor drive photography is effected with use of conventional motor drive device in which the power supply to the film take-up motor M2 is stopped before the completion of the film supply by the film feeding motor M1 and which is charged with a long-footage film having 100 feet or more length, the take-up spool is apt to be still rotated at the time when the shutter release operation is initiated and the sprocket becomes freely rotatable. This causes the disadvantageous feed or advance of the film during photography, thus inducing vibration in the picture plane.

The inertia of the take-up spool after stopping the power supply to the take-up motor (in other words, the time from the stoppage of the power supply to the take-up motor to the standstill thereof) gets larger in accordance that the diameter of the film wound up on the take-up spool becomes larger, while the tension of the film by the take-up spool becomes smaller in accordance therewith. The resistance (or load) against the tension at the film supply side gets larger in accordance with that the film diameter on the take-up spool gets larger.

The above-mentioned advance of the film during photography (or exposure) is caused in a case where the film take-up force of the take-up spool is larger than the resistant force thereagainst at the film supply side. In such a case, it is necessary to release the shutter after the rotation of the take-up spool, that is, after the rotation of the take-up motor has completely stopped, so that the film feeding at the time when the shutter is released may be prevented.

Where the film take-up force at the film take-up side is equal to or less than the resistant force at the film supply side, the disadvantageous feed of the film described above is not caused even if the take-up motor is rotating. (The rotational energy of the motor in this case is used to tighten the winding of the film on the take-up spool.)

SUMMARY OF THE INVENTION

The present invention has its object to provide a motor drive device for long footage-film, which can eliminate the above-noted disadvantages of the conventional devices. According to the present invention, a shutter can be released after a predetermined pause time has lapsed from the stoppage of the power supply to the take-up motor, where the pause time is so determined to be the longest time from the time when the power supply to the take-up motor is stopped to the time when the take-up motor is actually stopped rotating when photographing from the first photograph (or exposure) to the photograph (exposure) at which the tension by the take-up spool is equal to the resistant force thereto at the film supply side.

BRIEF DESCRIPTION OF THE DRAWINGS

Specific embodiments of the invention have been chosen for purposes of illustration and description, and are shown in the accompanying drawings, forming a part of the specification wherein.

DESCRIPTION OF THE PREFERRED EMBODIMENTS

Figure 1:
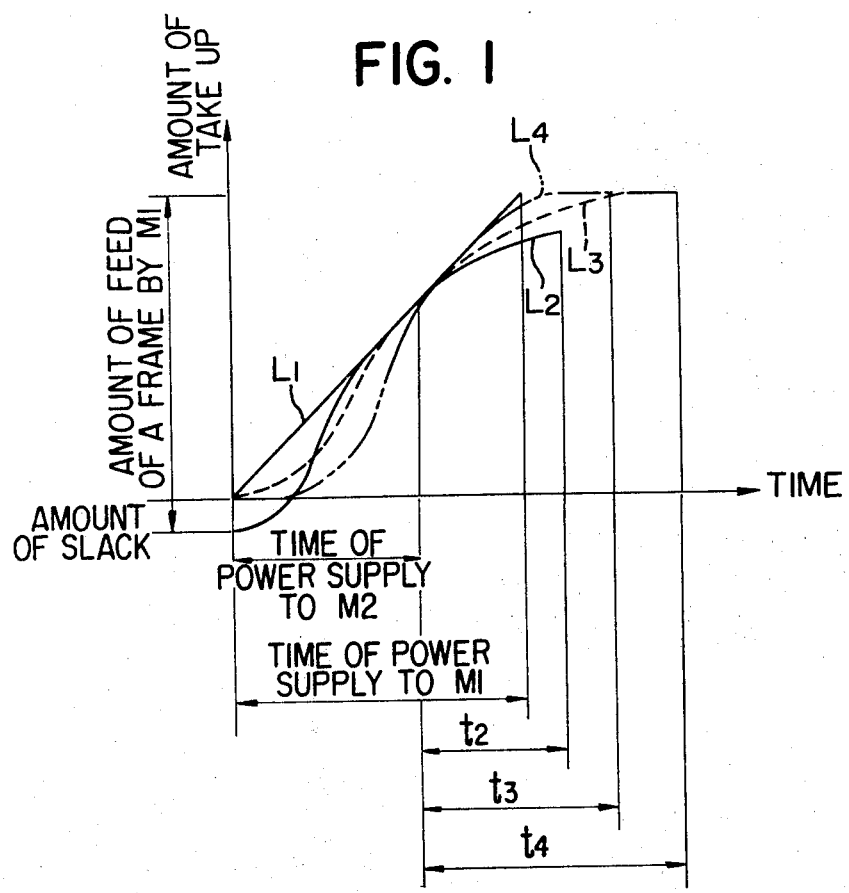
FIG. 1 is a graph illustrating the relation between the time during which the motors are powered and the amount of film take-up.
Figure 2:
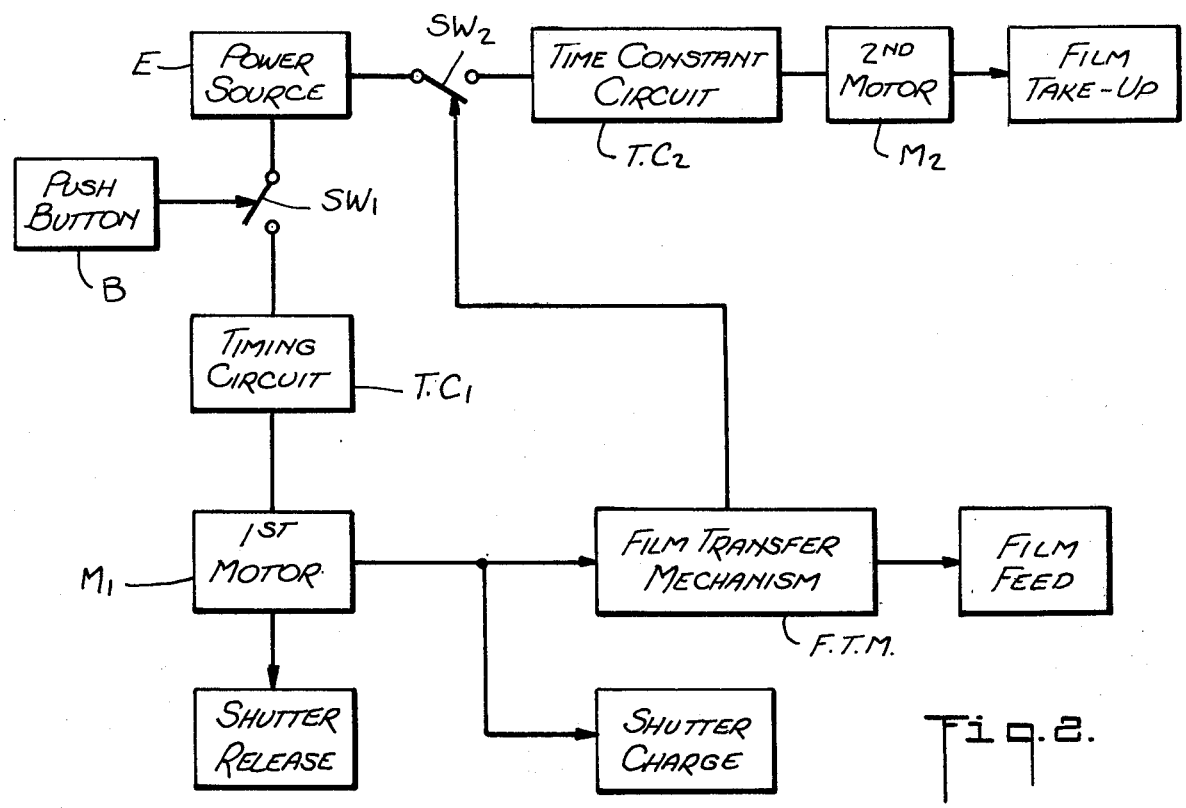
FIGS. 2 to 7 show an embodiment of the present invention, FIG. 2 being a block diagram, FIG. 3 being a graph illustrating the states of the switch, the time constant circuit and the motors, FIG. 4 being a diagram of a specific electric circuit forming a first time constant circuit, and FIGS. 5 to 7 being graphs of the wave forms generated by the electric circuit of FIG. 4.

In FIG. 2, there is provided within the main body of the motor drive device a first motor M1 for effecting shutter release, film feed and shutter charge and an interlocking switch SW2 interlocked with a film transfer mechanism F.T.M. within the camera body so that the switch SW2 is closed only during the film winding operation and opened except as above. The long-footage film magazine of the motor drive device has an extraneously operable push button B, a power switch SW1 adapted to be opened and closed by the push button B, and a timing circuit TC1 adapted to be connected to a power source E through the switch SW1. The motor M1 is connected to the power source E through the timing circuit TC1 and the switch SW1.

The motor drive device further includes a time constant TC2 connected to the power source E through the interlocking switch SW2, and a second motor M2 connected to the power source E through the switch SW2 and the time constant circuit TC2 to rotate the take-up spool for taking up the film.

Figure 4:
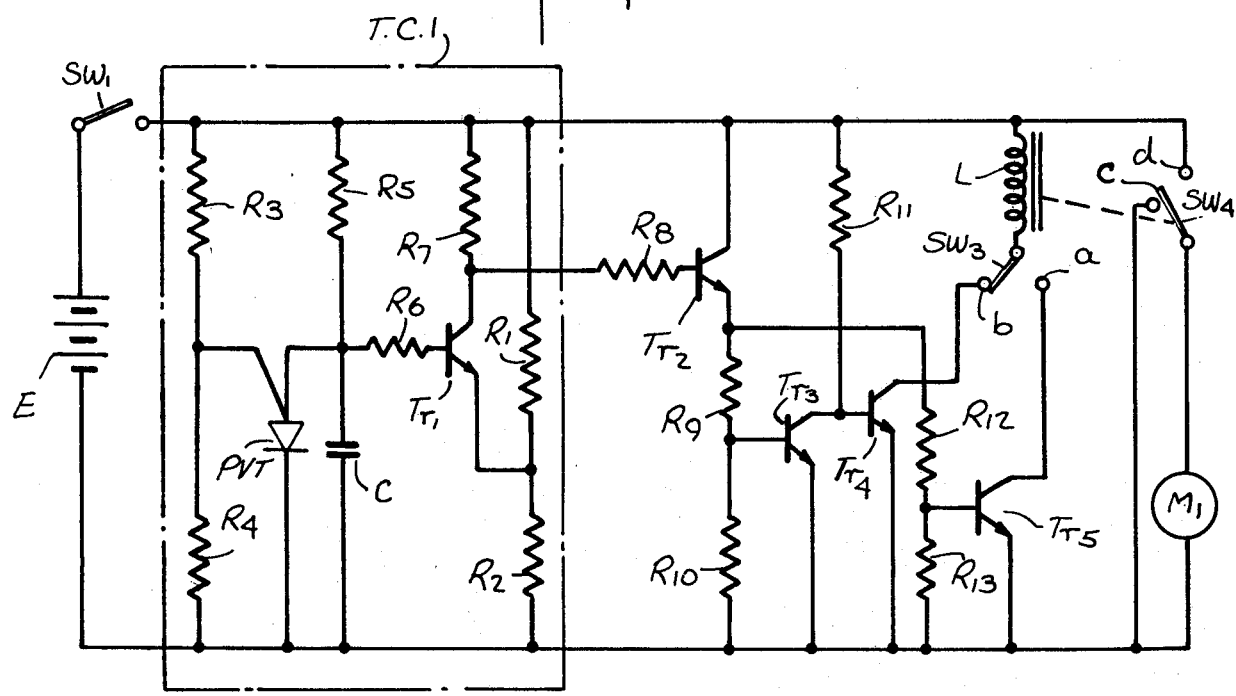

Reference will now be made to FIG. 4 to describe an example of a circuit comprising a timing circuit TC1 including a CR time constant circuit, a power source E, a power switch SW1 and a first motor M1.

In FIG. 4, a first group of voltage dividing resistors R1, R2, a second group of voltage dividing resistors R3, R4 and CR circuit comprising a capacitor C and a resistor R5 are parallel-connected together and connected to the opposite poles of the power source E through the aforementioned power switch SW1.

A transistor Tr1 which is first switching circuit has its base connected to the junction of the CR circuit through a resistor R6, its emitter connected to the junction between the voltage dividing resistors R1 and R2 of the first group, and its collector connected to the positive pole of the power source E through a resistor R7 and the power switch SW1.

A programmable unijunction transistor (abbreviated as PUT) which is a second switching circuit has its gate connected to the junction between the voltage dividing resistors R3 and R4 of the second group, its anode connected to the junction of the CR circuit and its cathode connected to the negative pole of the power source E.

The resistance values of the first voltage dividing resistor group R1, R2 are so selected that voltage across the capacitor C may become a trigger voltage of the transistor Tr1 after lapse of time Ta (shown in FIG. 3) from the initiation of the shutter release. The resistance values of the second voltage dividing resistor group R3 and R4 are so determined that voltage across the capacitor C may become a trigger voltage of the programmable unijunction transistor PUT after lapse of time Tb (shown in FIG. 3) from the initiation of the shutter release.

Figure 3:
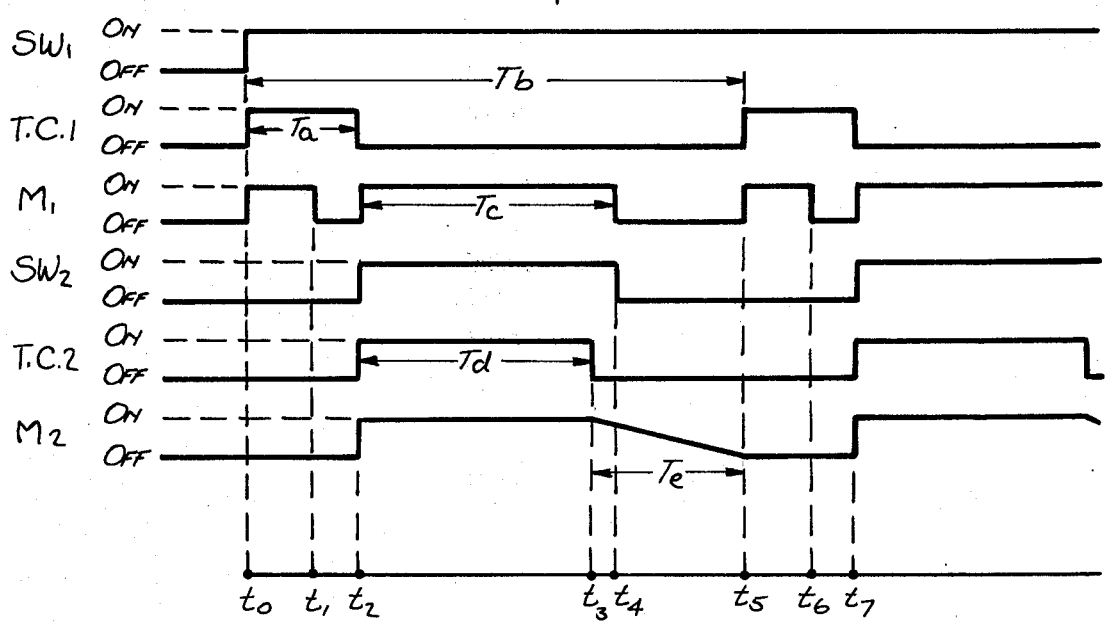

In FIG. 3, there is a relation of $Tb = Ta + Td + Te$, where Ta is time interval from the initiation of the shutter release to the initiation of film take-up operation (that is, time interval from the initiation of shutter release to the initiation of powering the second motor M2);

Td is time interval during which the second motor M2 is powered; and

Te is a predetermined pause time from the time when the power supply to the motor M2 is stopped to the initiation of the next shutter release.

A transistor Tr2 is connected at its base to the output of the timing circuit TC1 (that is, the junction between the collector of the transistor Tr1 and the resistor R7) through a resistor R8, at its emitter to the positive pole of the source E and at its collector to the negative pole of the source E through the resistors R9 and R10. A transistor Tr3 is connected at its base to the junction between the resistors R9 and R10, at its collector to the positive pole of the source E through the resistor R11 and at its emitter to the negative pole of source E. A transistor Tr4 is connected at its base to the positive pole of the power source E through the resistor R11, at its collector to the contact b of a switch SW3 and at its emitter to the negative pole of the source E. The switch SW3 is in coordination with the motor drive mechanism so that the switch SW3 is brought into contact with the contact a at the completion of the shutter release and is changed over into contact with the contact b at the completion of the film take-up operation. A switch SW4 is in coordination with a relay coil L so that the switch SW4 is connected to a contact d when the relay coil L is energized and is changed over into contact with a contact c when the relay coil L is not energized. A transistor Tr5 is connected at its base to the junction between the resistors R12 and R13, at its collector to the contact a of the relay coil L, and at its emitter to the negative pole of the power source E.

Operation of the circuit shown in FIG. 4 will now be described.

Upon depression of the push button B, the switch SW1 is closed (at time point t0 shown in FIG. 3), and the capacitor c begins to be charged. The transistor Tr1 is maintained non-conductive until the voltage across the capacitor c reaches a predetermined value. (In this state, the timing circuit TC1 is in its ON state). The transistor Tr2 whose base is connected to the output of the timing circuit through the resistor R8, is non-conductive, so the transistor Tr3 is non-conductive, the transistor Tr4 being conductive so that current flows through the relay coil L, the contact b of the switch SW3 and the transistor Tr4. Thus, the relay switch SW4 is changed over into contact with the contact d so that the first motor M1 rotates and the shutter release is effected (time point t0 in FIG. 3).

Upon completion of the shutter release (time point t1 in FIG. 3), the switch SW3 is changed over to the contact a from the contact b. At this time, the transistor Tr5 is non-conductive because the transistor Tr2 is non-conductive. Therefore, the relay coil L is not energized so that the relay switch SW4 is changed over into contact with the contact c to stop the first motor M1 (time point t1 in FIG. 3).

After the lapse of time Ta from the time point when the power switch SW1 is closed (that is, the time point t0 in FIG. 3), the voltage across the capacitor c becomes high enough to make the transistor Tr1 conductive so that the transistor Tr1 becomes conductive (the timing circuit Tc1 becomes "OFF"). Thus, the transistors Tr2, Tr3 and Tr5 are brought into conductive state, and the transistor Tr4 becomes non-conductive. Current flows through the relay coil L, contact a of the switch SW3 and transistor Tr5 so that the motor M1 begins to rotate, thereby film feed and shutter charge begin to be effected (time point t2 in FIG. 3).

After the lapse of time Tc from the time point t2 in FIG. 3, the film feed and shutter charge by the first motor M1 are completed, and the switch SW3 is brought into contact with the contact b from the contact a. As the transistor Tr4 is in the non-conductive state, the relay coil L is not energized so that the relay switch SW4 is changed over into contact with the contact c to thereby stop the first motor M1 (time point t4 in FIG. 3).

When the capacitor c has been further charged and the time interval (Tb−Ta) has passed from the time point t2, the voltage applied to the anode of the transistor PUT (that is, the voltage across the capacitor c) reaches its trigger level so that the transistor PUT becomes conductive. The capacitor, therefore, is discharged and returns to its initial state so that the transistor Tr1 becomes non-conductive. Thus, the timing circuit TC1 becomes "ON" again (time point t5 in FIG. 3). As the transistor Tr1 becomes non-conductive, the transistor Tr4 becomes conductive as described before, so that current flows through the relay coil L, contact b of the switch SW3 and transistor Tr4. The relay switch SW4 is changed over into contact with the contact d from the contact c so that the first motor M1 again rotates to initiate the shutter release operation.

Figure 8:
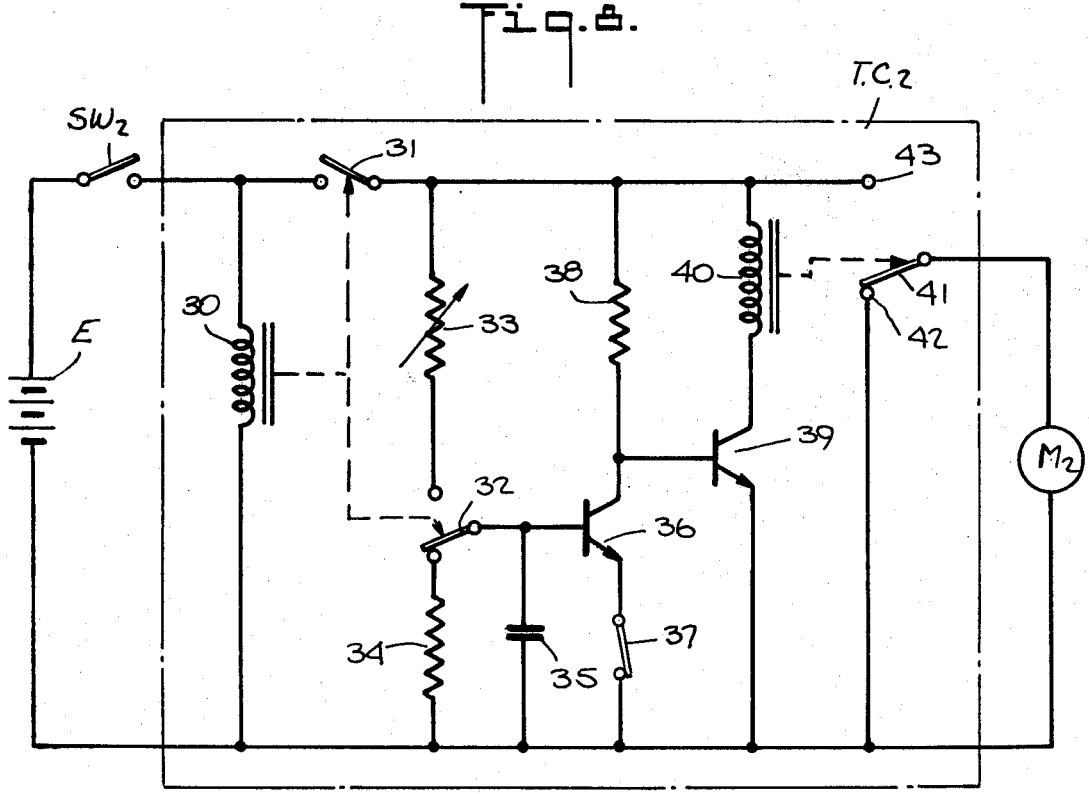
FIG. 8 is a circuit diagram showing a second time constant circuit.

Next, a circuit including the time constant circuit TC2, interlocking switch SW2, second motor M2 and power source E is illustrated with reference to FIG. 8.

Through the interlocking switch SW2 is connected a relay coil 30 to the power source E. The relay switches 31 and 32 are actuated by the relay coil 30. The switch 31 is connected at its one end to the junction between the relay coil 30 and the switch SW2, and at its other end to an end of a variable resistor 33. The switch 31 is so constructed as to close only during the energization of the coil 30. The relay switch 32 is usually connected to a resistor 34 only, and is changed over to be connected to the variable resistor 33 when the relay coil 30 is energized. The other end of the resistor 34 is connected to the negative pole of the power source E. A capacitor 35 is connected in parallel with the resistor 34 through the switch 32, and constitutes a CR circuit together with the variable resistor 33.

The base of the transistor 36 is connected to the junction betwen the switch 32 and the capacitor 35, its emitter to the negative pole of the source E through a switch 37 which is usually closed as described after, and its collector to the switch 31 through a resistor 38. The base of a transistor 39 is connected to the junction between the collector of the transistor 36 and the resistor 38, its emitter to the negative pole of the power source E and its collector to the switch 31 through a relay coil 40.

A switch 41 which is actuated by the second relay coil 40, is connected to a contact 42 when the relay coil 40 is not energized, which contact 42 is connected to the negative pole of the power source E. When the relay 40 is energized, the switch 41 is connected to a contact 43 which is in turn connected to the switch 31.

The second motor M2 for driving the take-up spool of the long-footage film magazine is connected at its one end to the negative pole of the power source E and at its other end to the switch 41, so that the motor M2 is powered by the source E only when the switch 41 is in contact with the contact 43.

Operation of the circuit shown in FIG. 8 will be explained.

By the driving operation of the first motor M1 described before, film feed is initiated and simultaneously therewith the switch SW2 interlocked with the film transfer mechanism FTM is closed (time point t1 in FIG. 3). By the closure of the switch SW2 the relay coil 30 is energized so that the switch 31 is closed and the switch 32 is disconnected from the resistor 34 and brought into connection to the variable resistor 33. The capacitor 35 is charged through the variable resistor 33.

The transistor 36 is held non-conductive until the capacitor 35 is charged to a predetermined voltage, so that the transistor 39 becomes conductive simultaneously with the closure of the switch 31, thereby the relay coil 40 being energized to cause the switch 41 to contact the contact 43. Thus, upon the closure of the switch SW2 the second motor M2 within the long-footage film magazine is energized (time point t2 in FIG. 3), the take-up spool within the magazine is rotated to thereby wind the film fed by the first motor M1 around the take-up spool within the magazine. Thereafter, after the lapse of time interval Td from the closure of the switch SW2 the voltage across the capacitor 38 reaches a predetermined value which makes the transistor 36 conductive (of course, the switch 37 is held closed). Because the transistor 36 becomes conductive, the transistor 39 becomes non-conductive so that the switch 41 is changed over into contact with the contact 42. Thereby, the second motor M2 is disconnected from the power source (time point t3 in FIG. 3). However, the second motor M2 continues to rotate by its own inertia and stops rotating at time point t5 in FIG. 3).

As clearly described above, the second motor M2 is maintained powered from the closure of the switch SW2 to the time when the voltage across the capacitor 35 reaches the predetermined value. This time interval during which the second motor M2 is powered is determined by the time constant of the CR circuit. Therefore, the time constant of the CR circuit (that is, the capacitance of the capacitor 35 and the resistance of the variable resistor 33) is so selected that the time interval during which the motor M2 is powered may be slightly smaller than the time interval during which the first motor M2 is powered.

Upon the completion of the film take-up operation the switch SW2 is opened so that the switches 31 and 32 return to the respective shown positions. The capacitor 35, therefore, is discharged through the resistor 34.

Next, the function of the switch 37 will be explained.

In a case where film is charged in the 250 frame long-footage film magazine, a film leading portion corresponding to about 5 to 7 frames is usually idly exposed. During these idle exposures the switch 37 is held open so that the time constant circuit TC2 may not function to thereby make equal the time intervals powering the motors M1 and M2. Thus, during these idle exposures, it is possible to prevent slackening of the film between the sprocket and the take-up spool so that the leading portion of the film can be firmly fixed to the take-up spool. This is the function of the switch 37.

For this purpose, the switch 37 is so interlocked with a film counter (not shown) that the switch 37 may be held open during the above-mentioned idle exposures. When the switch 37 is opened, the transistor 36 is held non-conductive even if the voltage across the capacitor 35 has become said predetermined value, so the transistor 39 is held conductive. Consequently, the time interval powering the motor M2 is determined by the switch SW2 so that that time interval is made equal to the time interval powering the motor M1.

Now, the shutter speed is selected in accordance with the photographing speed (frame speed). More specifically, as the frame speed is higher, the selectable shutter speed is confined within a high speed range and as the frame speed is lower, a lower shutter speed becomes usable.

The shutter speed and the frame speed are determined by the ON/OFF state of the timing circuit TC1, and this ON/OFF state is varied by the time constant of the CR circuit and the voltages set by the first and the second setting circuit.

Figure 5:
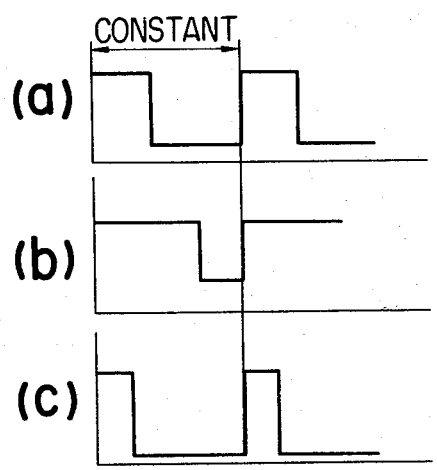
Figure 6:
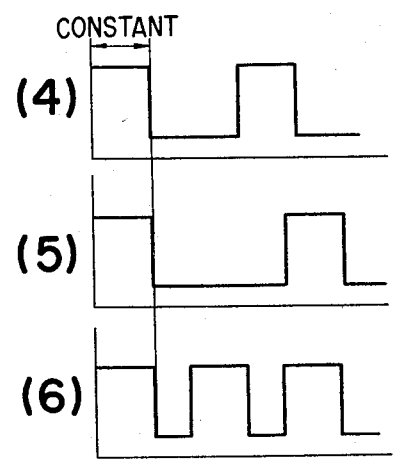
Figure 7:
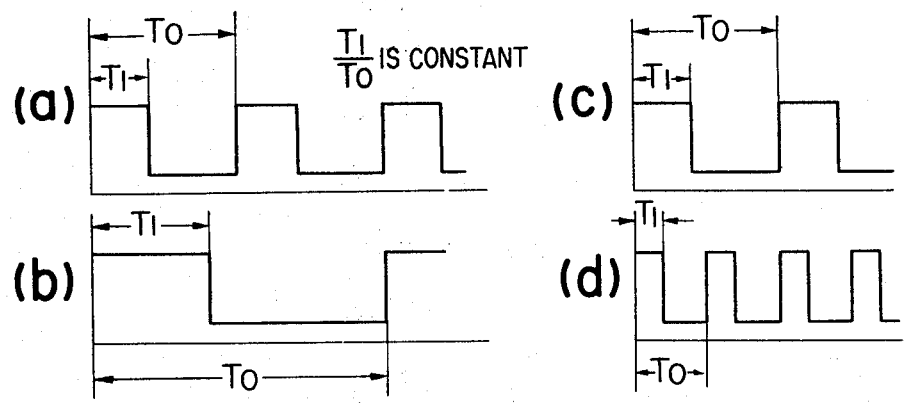

Reference will now be had to FIGS. 5 to 7 to describe how, in the circuit of FIG. 4, the duty ratio (pulse width $T_1$/recurrence period $T_0$) is varied by the variations in the capacitor C and the resistors R1–R5. FIG. 5 refers to the case in which the set voltage of the first setting circuit is variable, namely, the first group of voltage dividing resistors R1, R2, are a group of variable resistors.

In FIG. 5, (b) illustrates a case in which $r_2/r_1+r_2$ is greater than in the case of (a) and the frequency is constant while the duty ratio is greater; and (c) illustrates a case in which $r_2/r_1+r_2$ is smaller than in the case of (a) and the frequency is constant while the duty ratio is smaller.

FIG. 6 refers to the case in which the set voltage of the second setting circuit is variable, namely, the second group of voltage dividing resistors are a group of variable resistors.

In FIG. 6, (b) illustrates a case in which $r_4/r_3+r_4$ (where $r_3$ and $r_4$ are the resistance values of the resistors R3 and R4, respectively) is greater than in the case of (a) and the frequency is lower and the duty ratio is smaller but the OFF time of the transistor (Tr in FIG. 4) is constant; and (c) illustrates a case in which $r_4/r_3+r_4$ is smaller than in the case of (a) and the frequency is higher and the duty ratio is greater, but the OFF time of the transistor Tr is constant.

FIG. 7 refers to the case in which the resistor R5 or the capacitor C is of the variable type.

In FIG. 7, (b) illustrates a case in which $r_5$ (the resistance value of the resistor R5) or c (the electrostatic capacity of the capacitor C) is greater than in the case of (a) and the frequency is lower but the duty ratio is constant; and (d) illustrates a case in which $r_5$ or c is lower than in the case of (c) and the frequency is higher but the duty ratio is constant.

If a constant current circuit is connected instead of the resistor R5, the duty ratio will become more accurate.

Also, the resistors R1–R4 may of course be replaced by constant voltage elements or temperature compensating diodes.

According to the present invention, as has been described above, the next shutter release occurs after the film surface has completely stopped and this eliminates the blur which would result from the vibration of the film surface.

We believe that the construction and oepration of our novel motor drive device for long-footage film will now be understood and that the advantages thereof will be fully appreciated by those persons skilled in the art.

We claim:

1. In a motor drive device for long-footage film comprising a first motor for effecting shutter release as well as shutter charge and for driving a film supply spool in order to feed a predetermined length of the film, a second motor for rotating a take-up spool in order to take up the film fed by the first motor, and a time constant circuit for controlling the time interval during which the second motor is powered so that the power supply to the second motor may be cut off before the first motor feeds said predetermined length of the film, the improvement comprising control means for controlling the first motor so that shutter release by the first motor may be effected after the lapse of a predetermined time interval from the stoppage of the power supply to the second motor, which predetermined time interval is the longest time interval of the time intervals from the cut-off of the power supply to the second motor to the actual stoppage thereof when photographs are taken from the first exposure to an exposure in which the tension caused by the take-up spool becomes equal to the resistant force to the tension at the film supply spool side on the film.

2. A motor drive device according to claim 1, wherein said timing circuit comprises:
a time constant circuit including a capacitor,
a switching circuit connected to said capacitor so that the switching circuit may be turned on by the charging voltage of said capacitor at the time when said longest time interval has elapsed to generate a shutter release signal and so that said switching circuit may be turned off when said capacitor is discharged through said switching circuit.

3. A motor drive device according to claim 2, wherein said switching circuit includes a programmable unijunction transistor (PUT).

* * * * *